US011417061B1

(12) United States Patent
Feng et al.

(10) Patent No.: US 11,417,061 B1
(45) Date of Patent: Aug. 16, 2022

(54) THREE-DIMENSIONAL MESH GENERATION

(71) Applicant: Amazon Technologies, Inc., Seattle, WA (US)

(72) Inventors: Jianwei Feng, Seattle, WA (US); Vivek Yadav, Issaquah, WA (US); Pradeep Natarajan, Chicago, IL (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 11 days.

(21) Appl. No.: 17/159,853

(22) Filed: Jan. 27, 2021

(51) Int. Cl.
*G06T 17/20* (2006.01)
(52) U.S. Cl.
CPC .......... *G06T 17/20* (2013.01); *G06T 2210/12* (2013.01); *G06T 2210/22* (2013.01)
(58) Field of Classification Search
None
See application file for complete search history.

(56) References Cited

U.S. PATENT DOCUMENTS

| | | | |
|---|---|---|---|
| 7,835,568 B2 * | 11/2010 | Park ........................ | G06T 17/10 382/181 |
| 10,839,599 B2 * | 11/2020 | Yang ....................... | G06T 19/20 |
| 2019/0313058 A1 * | 10/2019 | Harrison ................. | G06V 10/50 |
| 2021/0386359 A1 * | 12/2021 | Adeli-Mosabbeb ........................ | A61B 5/1121 |

OTHER PUBLICATIONS

Bogo, Federica, et al. "Keep it SMPL: Automatic estimation of 3D human pose and shape from a single image." European conference on computer vision. 2016. (Year: 2016).*
Lee, Youn Joo, et al. "Single view-based 3D face reconstruction robust to self-occlusion." EURASIP Journal on Advances in Signal Processing 2012.1 (2012): 1-20. (Year: 2012).*

* cited by examiner

*Primary Examiner* — Sarah Le
(74) *Attorney, Agent, or Firm* — K&L Gates LLP

(57) ABSTRACT

Devices and techniques are generally described for three dimensional mesh generation. In various examples, first two-dimensional (2D) image data representing a human may be received. In various further examples, bounding box data identifying a location of the human in the first 2D image data and joint data identifying locations of joints of the human may be received. Second 2D image data representing a cropped portion of the human may be generated using the bounding box data and the joint data. A three-dimensional (3D) mesh prediction model may be used to determine a pose, a shape, and a projection matrix for the human. The 3D mesh prediction model may be used to determine a transformed projection matrix for the portion of the human represented in the second 2D image data.

20 Claims, 7 Drawing Sheets

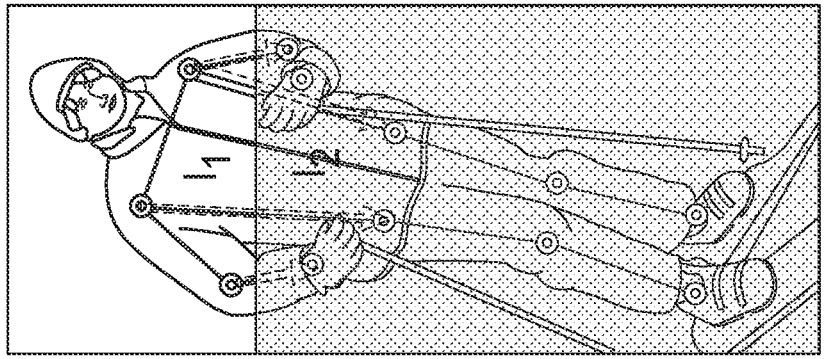
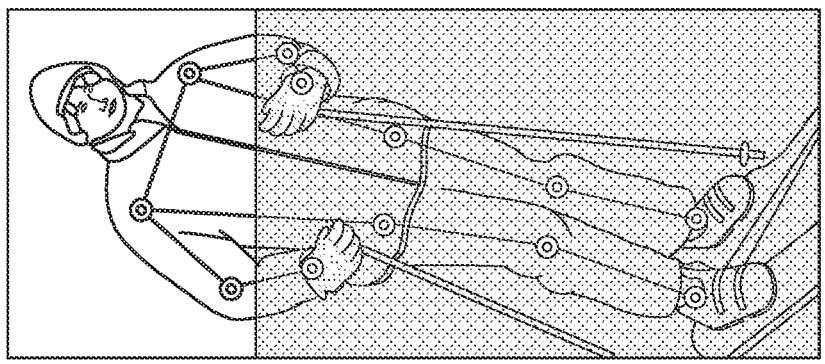
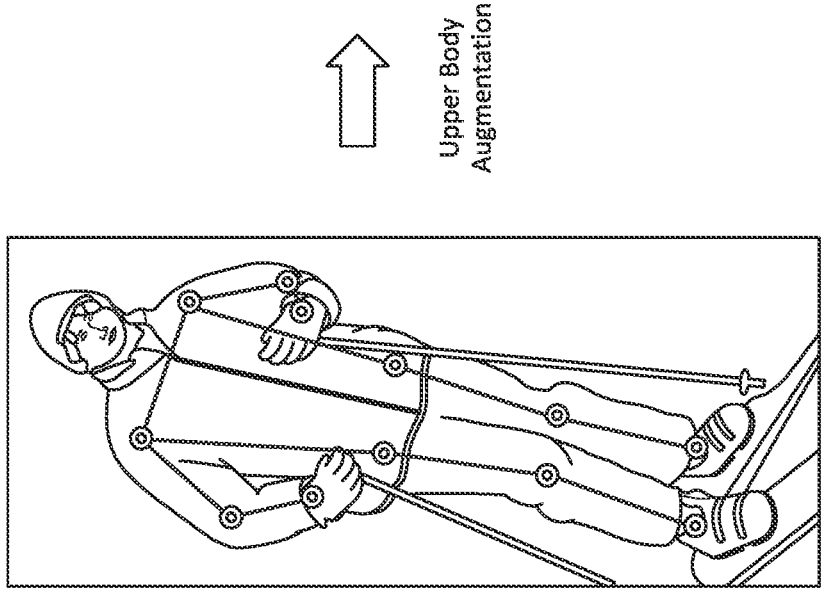
FIG. 4

THREE-DIMENSIONAL MESH GENERATION

BACKGROUND

Accurately estimating three-dimensional ("3D") poses from two-dimensional ("2D") reference points is a classical ill-posed problem in computer vision. Methods for 3D pose prediction are typically classified into model-free and model-based approaches. Typically, model-free approaches directly learn a mapping from 2D reference points to 3D joints. Predicting 3D joints from 2D reference points is a challenging task, since an infinite number of 3D poses exist that correspond to a given 2D skeleton due to positive ambiguity. Model-based approaches often fit 3D parametric models such as the skinned multi-person linear ("SMPL") representation to estimate 3D shape and pose. This is typically done by minimizing the 2D error between the projection of the predicted 3D pose in the 2D space and the given 2D reference points. However, 2D re-projection error alone is highly under-constrained and can be minimized via non-natural joint angles. To address these issues, previous 2D to 3D approaches have used various kinds of additional 3D supervision, including paired 2D-3D correspondences, unpaired 3D data, and synthetic data generated using motion capture ("MoCap") sequences.

BRIEF DESCRIPTION OF DRAWINGS

FIG. 4 depicts examples of limb orientation loss for three-dimensional mesh generation, in accordance with various aspects of the present disclosure.

DETAILED DESCRIPTION

Figure 1:
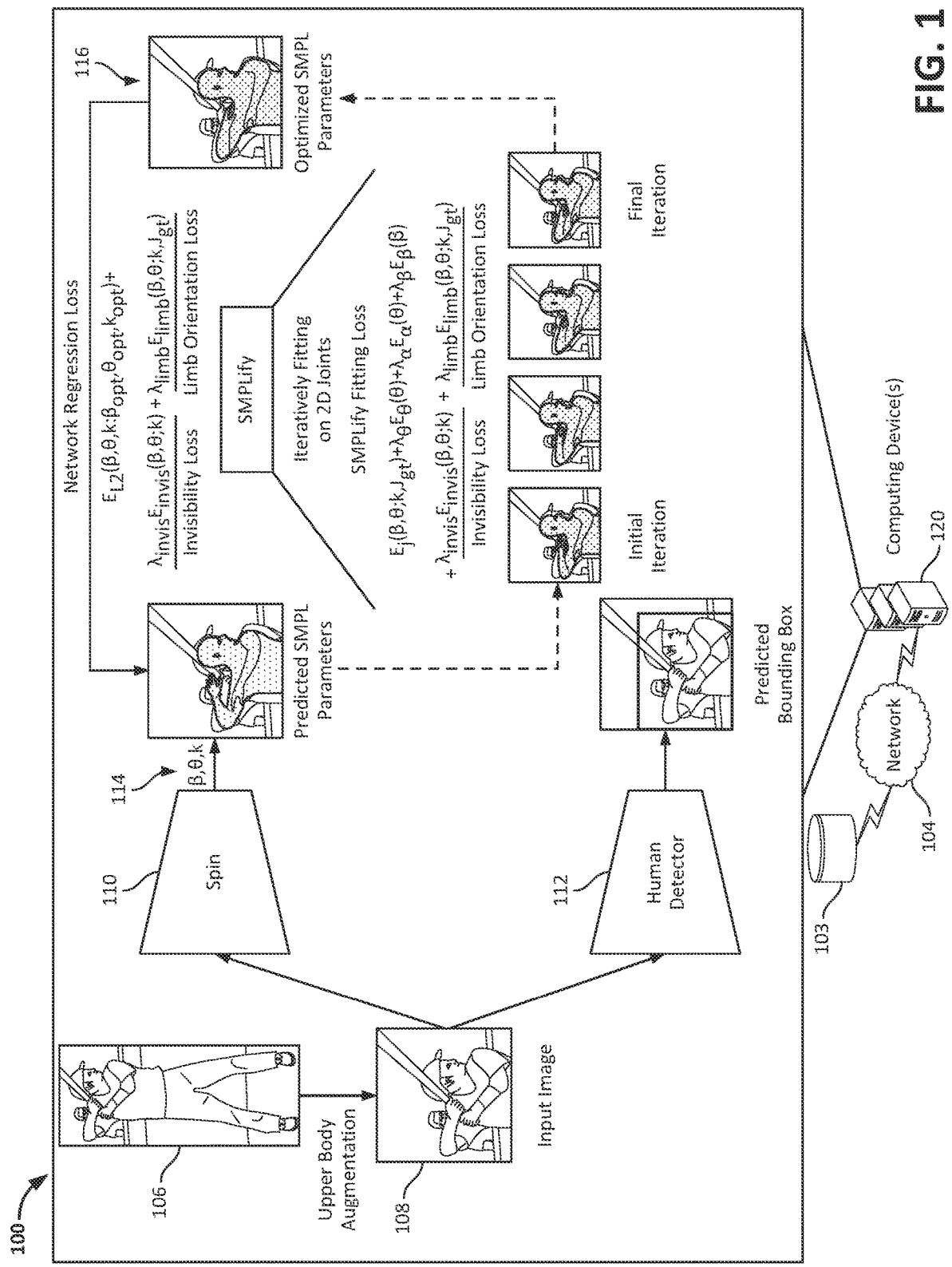
FIG. 1 is a diagram of an example system configured to generate three-dimensional mesh data, according to various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Dense human body mesh prediction is critical for enabling various computer vision experiences such as body-rendering in gaming, virtual try-on for fashion, augmented reality, etc. Many current algorithms fail to predict accurate 3D meshes when the entire body of the subject is not visible. Described herein are techniques to improve person detection and 3D body mesh prediction models in difficult upper-body view (or other partial view) conditions. In various examples, image data augmentation techniques are described that generate upper body (or other partial body) samples from an existing dataset for training robust person detection and mesh prediction models. In addition, described herein are two new loss terms that enforce visibility constraints and limb orientation constraints for human mesh prediction. In various examples, the enhancements described herein offer significant improvements in both bounding box detection and human mesh generation, particularly for upper body (or other partial body) samples. Furthermore, the techniques described herein allow models to improve performance for both full body samples and unseen upper body samples. Various techniques described herein significantly reduce errors in pose parameters, shape parameters, and projection matrix for mesh generation.

In some examples, a person detector may be used to detect people represented in a 2D image, followed by use of a 3D body mesh predictor to predict parameters of a 3D deformable mesh model of the person. Many person detectors accurately predict the bounding box around a person, yet fail for specific use cases where only part of the body (e.g., only the upper torso) is visible in the image. For example, the YOLO V3 person detector model's mean average precision (mAP) drops to 40% when only a subject's partial upper body is visible. Similarly, many 3D body mesh predictor algorithms fail when only partial upper body is visible. For example, the SPIN 3D body mesh prediction algorithm typically fails by predicting a smaller full body human mesh and incorrect joint location/orientation for difficult upper body conditions.

Many current 3D body mesh prediction algorithms and/or person detectors are trained using large scale dataset like Common Objects in Context (COCO) that are biased towards images depicting a full person. Subpar performance of person detector models and 3D body mesh prediction models for upper body view conditions may be due to a lack of relevant training data. Data augmentation is a common technique to expand the utility of a dataset. Accordingly, described herein are upper body (and other partial body) augmentation schemes where existing bounding box annotation, human joint (shoulder, elbow, etc.) annotations, and segmentation mask annotations are combined to generate upper body (and/or other partial body) training samples.

In addition, to further improve performance of 3D human mesh prediction algorithms for partial body cases, two new loss terms are introduced. Most 3D human mesh prediction algorithms minimize the loss between joints (e.g., joint location data describing the location of shoulder joints, elbow joints, etc.) in the input 2D image and 2D re-projections of the corresponding 3D joints from body mesh predictions for visible joints only. As a result, there is no penalty imposed on invisible joints (e.g., joints of the subject that are unrepresented in the input 2D image), and these joints are free to appear anywhere in the re-projected image. Accordingly, two new loss terms are described herein: invisibility loss and limb orientation loss (in addition to re-projection loss). These two new loss terms utilize invisibility information to impose additional constraints on invisible joint locations and limb orientation, especially in difficult partial upper body view conditions where re-projection error from visible joints alone is insufficient. During training, invisibility loss penalizes the 3D mesh prediction model for predicting invisible joints (e.g., joints that are not visible in the partial-body 2D input) as visible in the re-projected image, and limb orientation loss penalizes the errors in limb orientations for the limbs where one joint is visible and the other is invisible. Accordingly, described herein are novel partial body augmentation techniques, and two new loss function terms (invisibility loss and limb orientation loss) to improve performance of 3D human mesh prediction models. In various examples, the performance of many different human detector models (e.g., YOLO V3 Mobilenet, Centernet, Resnet50, etc.) and 3D body mesh prediction models (e.g., SPIN: SMPL oPtimization IN the loop) may be improved using the various techniques described herein.

Joints and/or joint data, as described herein may correspond to anatomical human joins (e.g., elbow joint, shoulder joint, etc.), but may also include, in at least some cases other points on the human form that are not traditionally described as joints. For example, a system may use 17 joints including {'nose', 'left_eye', 'right_eye', 'left_ear', 'right_ear', 'left_shoulder', 'right_shoulder', 'left_elbow', 'right_elbow', 'left_wrist', 'right_wrist', 'left_hip', 'right_hip', 'left_knee', 'right_knee', 'left_ankle', 'right_ankle'}. Other systems and/or implementations may use other joints (sometimes referred to as "key points") apart from those noted in the foregoing example.

Machine learning approaches have been used for 3D pose estimation of 2D image data and for human detection in 2D image data. Machine learning techniques are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model may be referred to as back propagation.

Previous 2D to 3D approaches can be broadly classified into model-free methods, and model-based methods. Model-free methods predict a 3D skeleton from 2D joints. Model-based approaches use a parametric model, such as SMPL, to estimate human meshes (e.g., 3D mesh representations of the human form). Several model-free and model-based approaches have used 3D supervision during training. The 3D information has been used in various forms such as paired 2D-3D data, 3D pose priors (e.g., a Gaussian Mixture Model) built using 3D motion capture sequences, learned priors using 3D data via discriminator models, and synthetic 2D-3D pairings. In various embodiments described herein, model-based and model-free predictions are generated without requiring any of the aforementioned types of 3D data during training.

SMPL is a realistic 3D model of the human body. SMPL takes pose parameters $\theta \in \mathbb{R}^{72}$ for 3D angles of joints and root orientation and shape parameters $\beta \in \mathbb{R}^{10}$ to control thinness of torso and limbs as input. SMPL outputs dense body mesh 3D vertices $M \in \mathbb{R}^{6890 \times 3}$ and 24 3D human joints (e.g., joint data) of interest from linear combination of dense vertices: $J \in \mathbb{R}^{24 \times 3} = WM$, where W is the linear regressor.

The SMPL body is projected into the 2D image plane by multiplying by a projection matrix $K_{2 \times 3}$ for orthographic projection.

$$K = \begin{bmatrix} s & 0 & t_x \\ 0 & s & t_y \end{bmatrix} \quad (1)$$

where K is parameterized by scale s and 2D horizontal and vertical translation ($t_x$, $t_y$). Rotation is not needed in projection matrix, as the first three values in SMPL pose parameter $\theta$ represent global rotation.

SMPLify is an algorithm that jointly fits SMPL pose parameters $\theta$, shape parameters $\beta$, and projection matrix K onto 2D joints $J_{gt}$ in re-projected 2D image data. The objective function minimized by SMPLify is:

$$\min_{\theta, \beta, K} E_{fit} = E_J(\beta, \theta; K, J_{gt}) + \lambda_\theta E_\theta(\theta) + \lambda_\alpha E_\alpha(\theta) + \lambda_\beta E_\beta(\beta) \quad (2)$$

The first term $E_J(\beta, \theta; K, J_{gt})$ represents the re-projection error between ground truth 2D joints $J_{gt}$ and reprojected SMPL joints J, and may be computed as 2D Euclidean distance. $E_\theta(\theta)$ is a mixture Gaussians pose prior loss. $E_\alpha(\theta)$ is the pose prior loss for elbows and knees to penalize unnatural rotations. $E_\beta(\beta)$ is the quadratic regularization term for shape parameters to penalize unnatural shape. $\lambda_\theta$, $\lambda_\alpha$, $\lambda_\beta$ are weights for the relevant loss terms.

In many datasets (e.g., COCO) only visible joints are annotated. Therefore, the re-projection error only penalizes visible joints and ignores the invisible joints. In partial upper body view conditions, when the visible joints are scarce, the supervision signal from re-projection error is weak in many cases. Described herein are invisibility loss and limb orientation loss which may be used as complementary supervision signals utilizing invisibility information to impose additional constraints on SMPL fitting, thereby improving the quality of 3D mesh prediction for partial body cases.

SPIN is a 3D mesh prediction algorithm that trains a convolutional neural network (CNN) to predict SMPL pose, shape, and projection matrix for each input 2D image. During training, the network prediction is used as initialization of SMPLify to fit SMPL parameters onto 2D ground truth label data (e.g., key points). The optimized SMPL parameters are then used to explicitly supervise the prediction of the network. This procedure is called mesh fitting in the loop. It has synergistic self-improving nature: better SMPL fits improve network prediction, while better initialization assists in the convergence of the fitting process.

In various examples described herein, SPIN may be used as a 3D mesh prediction model for 3D human mesh estimation. The SPIN network assumes a single person with a full body (e.g., no invisible joints) in the image. For multi-person 3D mesh estimation, a person detector may be used to detect bounding boxes of humans in the image. Each human instance may be cropped for single person 3D mesh estimation. To address use cases where a person only has upper/partial body visible in the scene, body augmentation techniques described herein may be used for training data enhancement. In addition, invisibility loss and limb orientation loss may be used as extra loss terms for both SMPLify and network regression.

FIG. 1 is a diagram of an example system 100 configured to generate 3D mesh data, according to various embodiments of the present disclosure. As depicted in FIG. 1, computing device(s) 120 may include non-transitory computer-readable memory 103 and/or may be configured in communication with non-transitory computer-readable memory 103, such as over network 104. In various examples, network 104 may represent a local area network (LAN) and/or a wide area network (WAN) such as the internet. In various examples, non-transitory computer-readable memory 103 may store instructions that may be used to implement the image data augmentation techniques, machine learning models (e.g., SPIN network 110, human detector 112, etc.), algorithms for training the machine learning models, parameters for the various machine learning models, training datasets, etc.

In FIG. 1, upper body augmentation (or, more generally, partial body augmentation) may be used to generate upper body training images 108 from full human body training images 106. Although the techniques described herein specifically describe training for upper torso (e.g., head and shoulders) images, the techniques may be used for any desired partial body training instances. Additionally, new loss terms (e.g., invisibility loss and limb orientation loss) may be used to improve fitting loss (e.g., SMPLify fitting loss) and network regression loss.

Upper Body Augmentation

Images with humans in popular datasets like COCO primarily include images depicting full human bodies (e.g., full human body training image 106). To include partial human bodies in training instances (e.g., upper body training image 108), upper body data augmentation techniques may be used to generate images with only upper body visible. Initially, the full body may be cropped from the full human body training image 106 so that only upper body is visible. Suppose $x_{min}$, $y_{min}$, $x_{max}$, $y_{max}$ are the top left and bottom right corners of the bounding box, the cropped bounding box may be computed as:

$$y_{max} = \max(y_{ls}, y_{rs}) + \gamma \max(\|p_{ls} - p_{rs}\|, \quad (3)$$
$$\|p_{face} - (p_{ls} + p_{rs})/2\|)$$

where $p_{ls}$ is the left shoulder keypoint, $p_{rs}$ is the right shoulder keypoint, $y_{ls}$, $y_{rs}$ are their y coordinates and $\|p_{ls}-p_{rs}\|$ is the Euclidean distance between two shoulders. $p_{face}$ is computed as the mean of five face keypoints: nose, left eye, right eye, left ear, right ear, and $\|p_{face}-(p_{ls}+p_{rs})/2\|$ is the Euclidean distance between center of face and center of shoulder. These various key points may be provided as ground truth annotations or may be computed, depending on the implementation. The maximum of the two Euclidean distances may be selected as an approximation of human scale, which can account for cases of side-facing bodies where the distance between shoulders can be small. Additionally, the expression in equation (3) can account for cases where the face is occluded and the center of face cannot be computed. $\gamma$ is a tunable parameter that determines the percentage of upper body to crop. $\gamma=0$ will result in the bounding box where only the head is visible. In some examples, this parameter may be varied during training (e.g., between 0:1 to 0:3) to provide variability in training instances. In some examples, during testing $\gamma$ may be fixed (e.g., to 0.2, or some other appropriate value).

After cropping, the bounding box may contain a significant amount of background image and may not tightly encapsulate the subject person in image. Accordingly, ground truth segmentation masks may be used to obtain tighter bounding boxes. During training of human detector 112, if the original image contains multiple people, one person may be selected (e.g., at random) for which to compute an upper body bounding box. In some examples, the cropped box may be extended to (0, 0, $y_{max}$, w) to contain the whole upper image so that the cropped image may contain multiple people, with at least one person having only their upper body be visible. For other persons presented in the cropped image, their ground truth bounding boxes may be truncated using the ground truth segmentation mask.

During training of the SPIN network 110 (or another 3D mesh prediction model), upper body augmentation may be applied to each person instance in the training image, cropped by the ground truth bounding box (as described above) and fed to the 3D mesh prediction model 110 as an input 2D image. The visibility of the ground truth joints (e.g., ground truth joint data) may be reset after cropping, and re-projection error may only be applied to visible joints.

For SMPL parameters 114, SMPLify is quite prone to initialization and relies on the whole human torso to obtain an initial estimate of scale. As the whole human torso is not available in cropped images, SMPLify may fail due to random initialization for cropped samples. Therefore, optimized SMPL parameters 116 for the full body may be used prior to cropping for SMPLify initialization. For the cropped image, the pose and shape parameters $\beta$, $\theta$ remain the same but the projection matrix K is transformed. The parameters for K are (s, $t_x$, $t_y$) due to orthographic projection, and parameters for the transformed projection matrix K' may be derived on the cropped image as (s, $t_x$, $t_y$-$y_{max}$).

Figure 2:
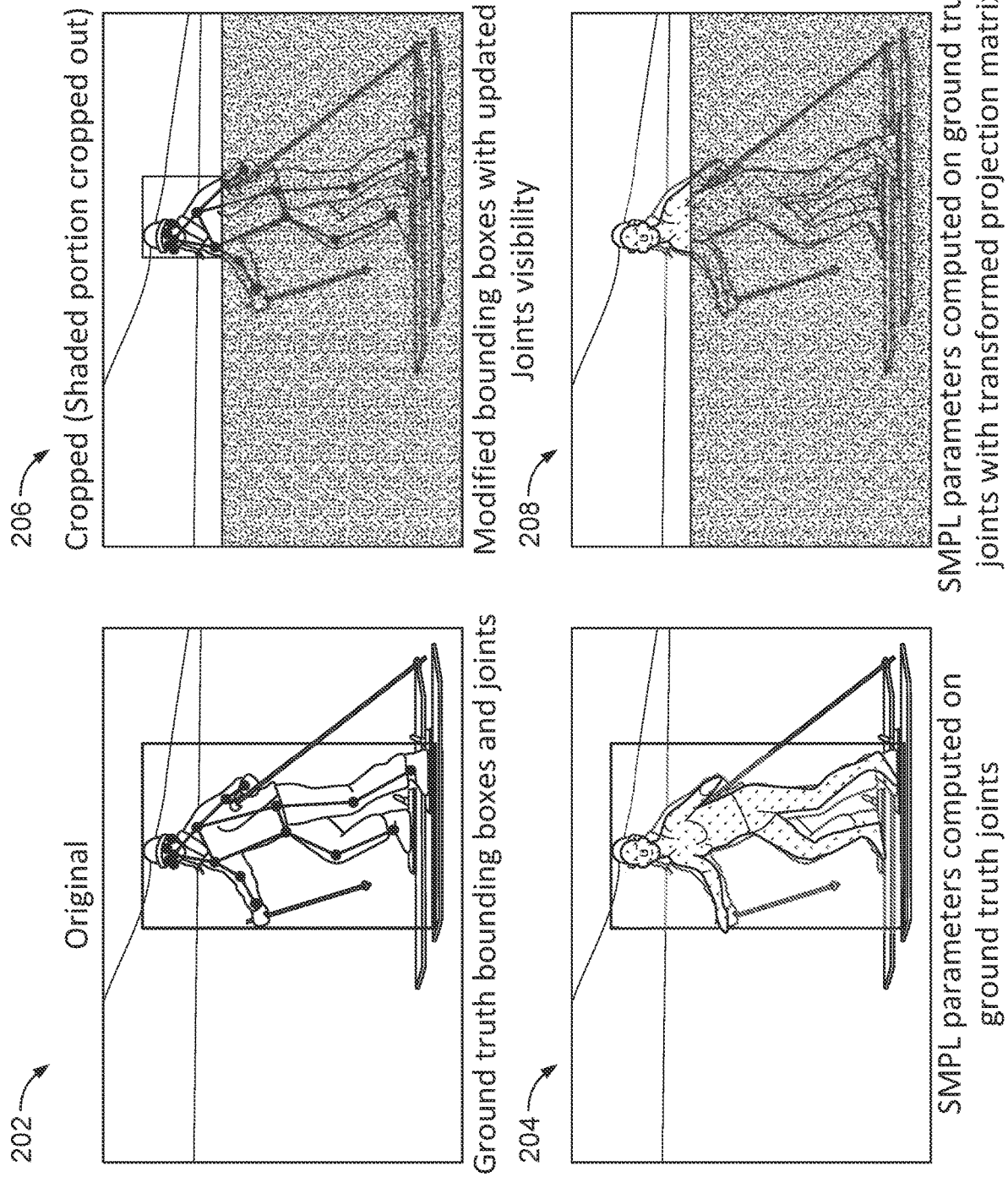
FIG. 2 depicts example generation of augmented training data for three-dimensional mesh generation, in accordance with various aspects of the present disclosure.

FIG. 2 depicts example generation of augmented training data for three-dimensional mesh generation, in accordance with various aspects of the present disclosure. In FIG. 2, original training instance 202 includes ground truth bounding boxes identifying the location of the human and ground truth joint data identifying the location of joints of the human. Image 204 is a 2D projection of a 3D mesh generated using SMPL parameters computed for the ground truth joint data of training instance 202.

In image 206, the image data has been cropped using the techniques described above to depict only the upper torso of the human with the lower, shaded portion of the image being cropped out (e.g., not included). Accordingly, the joints in the shaded portion represent invisible joints. Image 208 is a 2D projection of a 3D mesh generated using SMPL parameters computed for the ground truth joints with a transformed projection matrix K'. The transformed projection matrix K' may constrain the 2D projection of SMPLify to project only the portion of the 3D mesh representation of the human of the cropped image (e.g., upper body augmentation).

Loss Function Enhancements

The SPIN 3D mesh prediction model predicts SMPL pose parameters θ, shape parameters and projection matrix K for a given input image. During training, SPIN uses network prediction as initialization for SMPLify to generate optimized SMPL parameters (e.g., optimized SMPL parameters 116) as targets for network regression. For SMPLify fitting loss and network regression loss, only visible joints are penalized by re-projection error. This represents an ill-posed loss function that does not penalize invisible joint predictions, causing failure for 3D mesh prediction models in partial body cases. Accordingly, two new loss terms described herein—invisibility loss and limb orientation loss—are used to enhance 3D body mesh prediction. These two loss terms are applied for both network regression and SMPLify optimization during training, as depicted in FIG. 1.

Specifically, for SMPLify optimization, the extra loss terms are applied as follows:

$$\min_{\theta,\beta,K} E_J(\beta, \theta; K, J_{gt}) + \lambda_\theta E_\theta(\theta) + \lambda_\alpha E_\alpha(\theta) +$$

$$\lambda_\beta E_\beta(\beta) + \lambda_{invis} E_{invis}(\beta, \theta, K) + \lambda_{limb} E_{limb}(\beta, \theta; K, J_{gt})$$

where $E_{invis}(\beta, \theta; K, J_{gt})$ and $E_{limb}(\beta, \theta; K, J_{gt})$ are the extra loss terms added for invisibility loss and limb orientation loss, respectively, during SMPLify optimization. $\lambda_{invis}$ and $\lambda_{limb}$ are the respective weights.

The loss function for network regression is as follows:

$$\min_{\theta,\beta,K} E_{L2}(\beta, \theta; K, \beta_{opt}, \theta_{opt}, K_{opt}) +$$

$$\lambda_{invis} E_{invis}(\beta, \theta, K) + \lambda_{limb} E_{limb}(\beta, \theta; K, J_{gt})$$

where $E_{L2}(\beta, \theta; K, \beta_{opt}, \theta_{opt}, K_{opt})$ is L2 loss between predicted SMPL parameters and projection matrix θ, β, K and optimized SMPL parameters and projection matrix $\theta_{opt}$, $\beta_{opt}$, $K_{opt}$. The remaining terms are invisibility loss and limb orientation loss terms, which are the same as in SMPLify optimization.

Invisibility Loss

Although invisible joints do not contribute to the re-projection loss, knowledge of invisible joints that do not appear in the cropped 2D image can be utilized as extra supervision for model training. Accordingly, the invisibility loss is defined to enforce such constraint. The loss function has the following properties: 1) when the invisibility constraint is satisfied (e.g., the joint is placed outside the re-projected 2D image), the loss is zero; 2) when the invisibility constraint is unsatisfied (e.g., the invisible joint is placed inside image by the 3D mesh prediction model), the loss is greater than zero; and 3) the loss function has a descending landscape from the center of the image to the image boundary to allow gradient descent to slowly drag the joint outside image during training.

Figure 3:
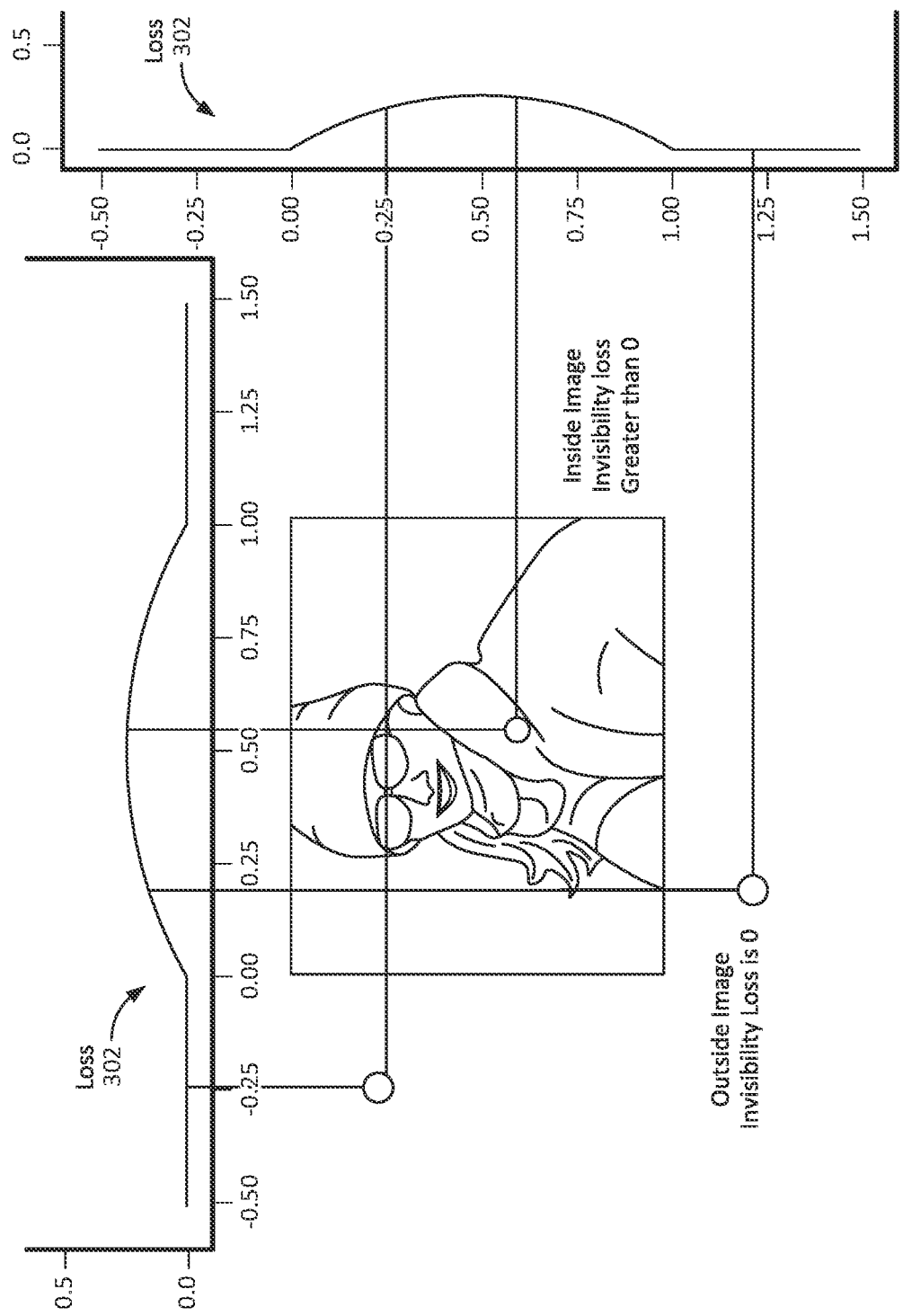
FIG. 3 depicts examples of invisibility loss for three-dimensional mesh generation, in accordance with various aspects of the present disclosure.

To satisfy these three properties for invisibility loss, the predicted joint coordinates may be normalized to lie between 0 and 1. The invisibility loss may then be defined as follows:

$$E_{invis}(\beta, \theta; K) = \frac{1}{\sum_i v_i} \sum_i^k v_i (relu(x_{pred}^i) relu(1 - x_{pred}^i) relu(y_{pred}^i) relu(1 - y_{pred}^i))$$

where k is the number of joints, $v_i$ is the ground truth visibility for the join (e.g., $v_i=1$ if joint is visible otherwise $v_i=0$), $x_{pred}^i$ are the normalized x coordinates of ith joint red $J_{pred}^i$ parameterized by β, θ and K. $y_{pred}^i$ are the normalized y coordinates. The invisibility loss is quadratic in the x and y dimensions, and is only applied to joints with invisibility in the ground truth image. FIG. 3 depicts examples of invisibility loss for three-dimensional mesh generation, in accordance with various aspects of the present disclosure. As shown, joints with invisibility in the ground truth image (e.g., a joint that appears outside of the cropped image) that appear within the re-projection of the predicted 3D mesh are penalized with the invisibility loss. The invisibility loss 302 becomes smaller as the invisible joint approaches the image boundary and is greater near the center of the image. When invisible joints appear outside the image, the loss 302 is zero.

Limb Orientation Loss

Both the re-projection loss and the invisibility loss, only penalize the location of the invisible key point. The orientation information of limbs is also important. A limb vector is formed by two consecutive joints. For example, left upper arm is formed by left shoulder joint and left elbow joint. Limb orientation loss is defined as error in unit vectors between limbs from predicted SMPL mesh (e.g., from the 2D projection of the predicted 3D mesh) and ground truth limbs.

The limb orientation loss is especially crafted to penalize the limbs that connect a visible joint to an invisible joint. Without the limb orientation information, a model cannot correctly infer the pose of such limbs. To compute the ground truth limb orientation, the coordinates of the invisible joints are needed as well. The difference between a limb represented by the re-projected joints and the same limb represented by corresponding joints in the input image may be determined. With the upper body augmentation techniques described above, the coordinates of the invisible joints can be used post-cropping to compute the ground truth limb orientation vector. Therefore, the limb orientation loss can be used to penalize the model for making incorrect predictions regarding orientation of the limbs.

$$E_{limb}(\beta, \theta; K, J_{gt}) = \frac{1}{k} \sum_i^k w_i \left( \left\| \vec{limb}_{pred}^i - \vec{limb}_{gt}^i \right\|_2 \right)$$

where k is the number of limb vectors that are connected with one visible joint and one invisible joint, $\vec{limb}_{pred}^i$ is the predicted unit vector of ith limb parameterized by β, θ, K $\vec{limb}_{gt}^i$ is the unit vector of ith ground truth limb computed from $J_{gt}$, and $w_i$ is computed by the ratio of the visible part of the limb in the image.

FIG. 4 depicts examples of limb orientation loss for three-dimensional mesh generation, in accordance with various aspects of the present disclosure. In FIG. 4, the weight for the limb connecting the right shoulder and right hip is computed as $$w = \frac{l_1}{l_1 + l_2},$$

where $l_1+l_2$ is the total length of the limb and $l_1$ is the length for the visible part. The penalty applied to limb orientation is related to the visible ratio (saliency) of the limb in the image.

Figure 5:
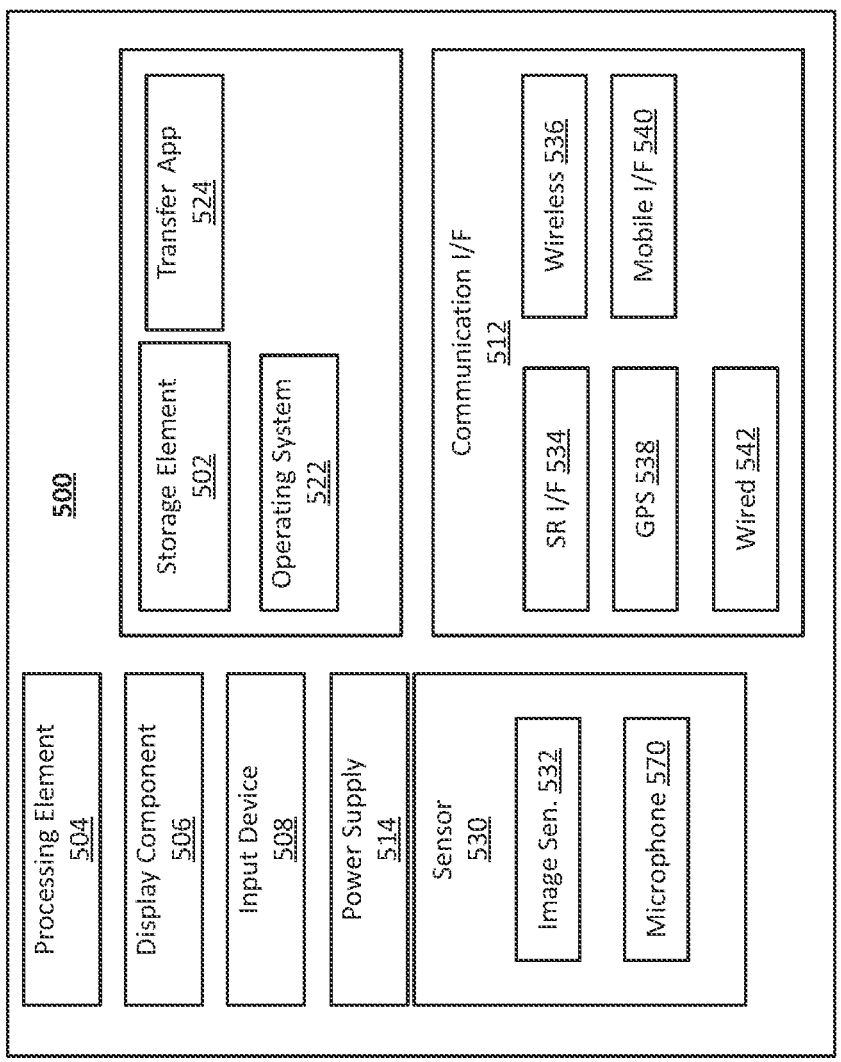
FIG. 5 is a block diagrams showing an example architecture of a computing device that may be used in accordance with various embodiments described herein.

FIG. 5 is a block diagram showing an example architecture 500 of a computing device that may be used to generate three-dimensional mesh data, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or 3D pose image data generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 6:
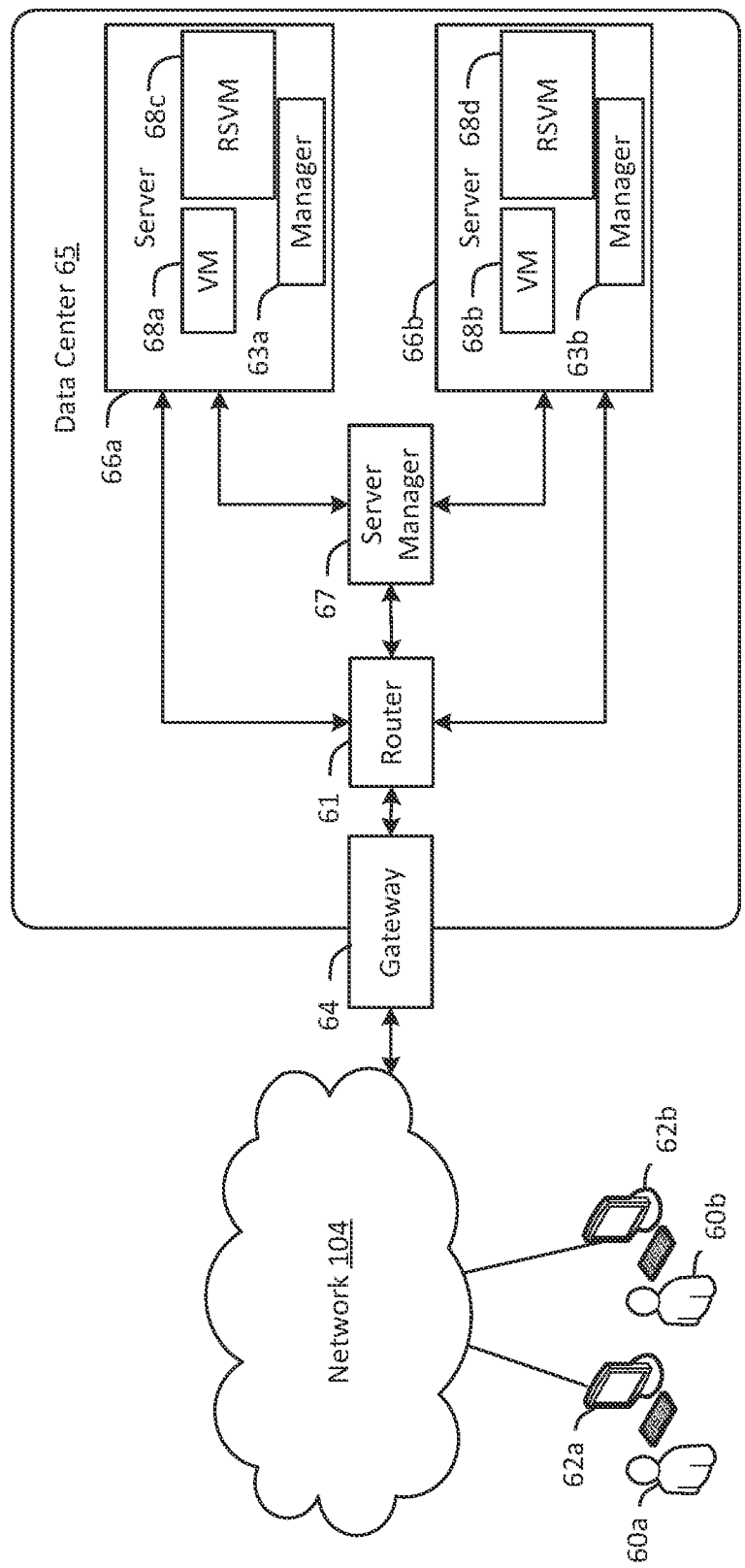
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide 3D pose generation as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various 3D pose generation techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++ and the like or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
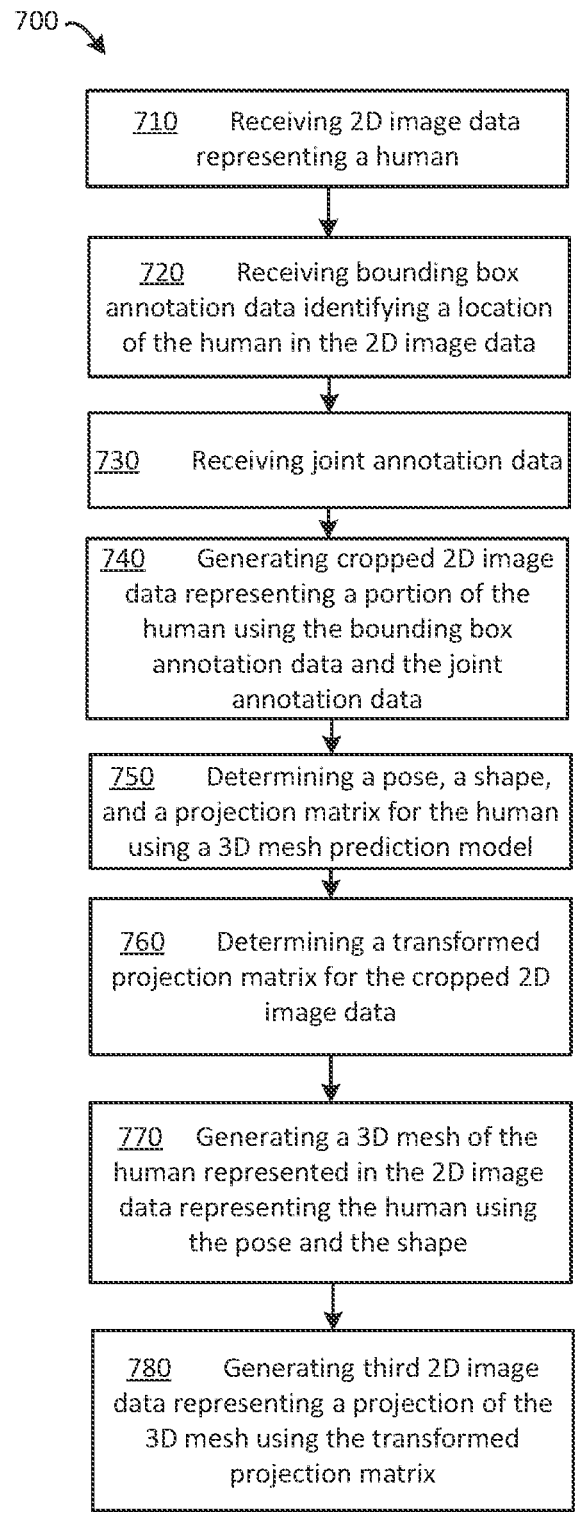
FIG. 7 is a flow chart depicting an example process for three-dimensional mesh generation from two-dimensional input data, in accordance with various aspects of the present disclosure.

FIG. 7 is a flow chart depicting an example process 700 for three-dimensional mesh generation from two-dimensional input data, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 of FIG. 7 may begin at action 710, at which 2D image data representing at least one human may be received. The 2D image data may be, for example, training data annotated with various labels, as described below. Processing may continue to action 720, at which bounding box annotation data identifying a location of at least one human in the 2D image data may be received. In various examples, the bounding box may be defined by pixel locations within the frame of 2D image data. For example, the bounding box annotation may define pixel locations of the four corners of the bounding box within the 2D grid of the 2D image data. In some other examples, segmentation mask annotation data may be received that labels pixels corresponding to the human as distinguished from pixels that do not correspond to the human.

Processing may continue at action 730, at which joint annotation data may be received. The joint annotation data may label the location of joints of the human (e.g., shoulders, elbows, neck, hips, etc.) within the image data. Processing may continue at action 740, at which cropped 2D image data representing a partial body of the human (e.g., a portion of the human image data) may be generated using the bounding box annotation data and the joint annotation data. For example, the techniques described above for generating cropped image data for an upper torso of a human may be used to crop the image data to obtain cropped image data that represents only the upper torso (e.g., head and shoulders) of the human.

Processing may continue at action 750, at which a pose, shape, and projection matrix may be determined for the human using a 3D mesh prediction model. For example, SPIN may be used to predict SMPL pose, shape, and a projection matrix for the input 2D image data. As previously described, the visibility of ground truth joints (e.g., ground truth joint data) may be reset after cropping, and re-projection error may only be applied to visible joints.

Processing may continue at action 760, at which a transformed projection matrix may be determined for the cropped 2D image data. Optimized SMPL parameters 116 for the full body may be used prior to cropping for SMPLify initialization. For the cropped image, the pose and shape parameters $\beta$, $\theta$ remain the same but the projection matrix K is transformed. The parameters for K is (s, $t_x$, $t_y$) due to orthographic projection, and parameters for the transformed projection matrix K' may be derived on the cropped image as (s, $t_x$, $t_y$-$y_{max}$). max).

Processing may continue at action 770, at which a 3D mesh of the human represented in the 2D image received at action 710 may be generated using the pose and the shape. For example, SPIN may fit the SMPL pose and shape parameters onto the ground truth key points (e.g., the joint annotation data). Processing may continue at action 780, at which third 2D image data may be generated. The third image data may represent a projection of the 3D mesh using the transformed projection matrix and may be constrained by the transformed projection matrix to project only the portion of the 3D mesh that corresponds to the cropped 2D image data. SMPLify may use the transformed projection matrix to project the 3D mesh of the portion of the human represented in the cropped 2D image data back into a two-dimensional space.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of predicting mesh data, comprising:
receiving first two-dimensional (2D) image data representing a human body, wherein the first 2D image data is labeled with a bounding box surrounding image data representing the human body within the first 2D image data;
determining ground truth label data representing locations of joints of the human body in the first 2D image data;
generating a cropped bounding box using the ground truth label data, wherein the cropped bounding box surrounds image data representing an upper torso and face of the human body and excludes at least a portion of the image data representing the human body;
determining, using a three-dimensional (3D) mesh prediction model, a pose parameter θ, a shape parameter β, and a projection matrix K for the human body represented in the first 2D image data, the projection matrix K parameterized by scale s and 2D translation ($t_x$, $t_y$), wherein $t_x$ represents horizontal translation within an image and $t_y$ represents vertical translation within the image;
determining a transformed projection matrix K' parameterized by the scale s and by transformed 2D translation ($t_x$, $t_y$−$y_{max}$), wherein $y_{max}$ represents the cropped bounding box; and
predicting, using the 3D mesh prediction model, a 3D mesh of the human body using the pose parameter θ, the shape parameter β, and the transformed projection matrix K'; and
projecting the 3D mesh as second 2D image data using the transformed projection matrix K', wherein the second 2D image data depicts the upper torso and face of the human body as represented in the 3D mesh.

2. The method of claim 1, further comprising:
determining a first joint present in the second 2D image data;
determining that the first joint is not depicted within the cropped bounding box of the first 2D image data;
generating a loss term related to the first joint being not depicted within the cropped bounding box of the first 2D image data and being present in the second 2D image data; and
updating parameters of the 3D mesh prediction model to minimize a value of the loss term.

3. The method of claim 1, further comprising:
determining two connected joints of the ground truth label data;
determining a first vector representing the two connected joints of the ground truth label data;
projecting the 3D mesh as second 2D image data;
determining a first joint in the second 2D image data, the first joint corresponding to one of the two connected joints of the ground truth label data;
determining a second joint of a predicted 3D mesh, wherein the second joint is connected to the first joint;
determining a second vector representing a connection of the first joint and the second joint;
determining a limb orientation loss term representing a difference between the first vector and the second vector; and
updating parameters of the 3D mesh prediction model to minimize a value of the limb orientation loss term.

4. A method comprising:
receiving first two-dimensional (2D) image data representing a human;
receiving bounding box data identifying a location of the human in the first 2D image data;
receiving joint data identifying one or more locations of joints of the human in the first 2D image data;

generating second 2D image data representing a portion of the human using the bounding box data and the joint data;

determining, using a three-dimensional (3D) mesh prediction model, a pose, a shape, and a projection matrix for the human represented in the first 2D image data;

determining, using the 3D mesh prediction model, a transformed projection matrix for the portion of the human represented in the second 2D image data;

generating, using the 3D mesh prediction model, a 3D mesh of the human represented by the first 2D image data using the pose and the shape; and generating third 2D image data representing a projection of the 3D mesh using the transformed projection matrix, wherein the third 2D image data represents the portion of the human depicted in the second 2D image data.

5. The method of claim 4, further comprising generating the transformed projection matrix based at least in part on the pose, the shape, and the projection matrix for the human represented in the first 2D image data.

6. The method of claim 4, further comprising:
determining a first joint represented in the third 2D image data;
determining that the first joint is unrepresented in the second 2D image data; and
determining a loss associated with the first joint being present in the third 2D image data.

7. The method of claim 4, further comprising updating parameters of the 3D mesh prediction model to minimize a loss associated with joints of the human that are unrepresented in the second 2D image data representing the portion of the human being present in the 3D mesh of the portion of the human.

8. The method of claim 4, further comprising:
determining a first limb orientation between two joints of the joint data;
determining a first vector representing the first limb orientation;
determining a second limb orientation in the third 2D image data, the second limb orientation corresponding to the same limb as the first limb orientation;
determining a second vector representing the second limb orientation; and
determining a loss related to a difference between the first vector and the second vector.

9. The method of claim 4, further comprising:
determining a ground truth limb orientation for a first limb of the human using the joint data; and
determining a predicted limb orientation of the third 2D image data, wherein the predicted limb orientation is determined using a joint visible in the third 2D image data and a joint unrepresented in the third 2D image data and represented in the joint data identifying locations of joints of the human in the first 2D image data.

10. The method of claim 9, further comprising:
determining a loss representing a difference between the ground truth limb orientation and the predicted limb orientation; and
updating at least one parameter of the 3D mesh prediction model to minimize the loss.

11. The method of claim 4, further comprising generating the second 2D image data by determining at least one of a distance between shoulder joints of the human and a position of a center of a face of the human.

12. The method of claim 4, further comprising:
determining an invisibility loss representing instances of the 3D mesh prediction model predicting joints that are invisible in the second 2D image data as visible in the 3D mesh;
determining a limb orientation loss representing errors in limb orientation for limbs where one joint is visible in the second 2D image data and the other joint is unrepresented in the second 2D image data; and
updating parameters of the 3D mesh prediction model to minimize the limb orientation loss and the invisibility loss.

13. A system comprising:
at least one processor; and
non-transitory computer-readable memory storing instructions that, when executed by the at least one processor, are effective to:
receive first two-dimensional (2D) image data representing a human;
receive bounding box data identifying a location of the human in the first 2D image data;
receive joint data identifying one or more locations of joints of the human in the first 2D image data;
generate second 2D image data representing a portion of the human using the bounding box data and the joint data;
determine, using a three-dimensional (3D) mesh prediction model, a pose, a shape, and a projection matrix for the human represented in the first 2D image data;
determine, using the 3D mesh prediction model, an transformed projection matrix for the portion of the human represented in the second 2D image data;
generate, using the 3D mesh prediction model, a 3D mesh of the human represented by the first 2D image data using the pose and the shape; and
generate third 2D image data representing a projection of the 3D mesh using the transformed projection matrix, wherein the third 2D image data represents the portion of the human depicted in the second 2D image data.

14. The system of claim 13, the non-transitory computer-readable memory storing further instructions that, when executed by the at least one processor, are further effective to generate the transformed projection matrix based at least in part on the pose, the shape, and the projection matrix for the human represented in the first 2D image data.

15. The system of claim 13, the non-transitory computer-readable memory storing further instructions that, when executed by the at least one processor, are further effective to:
determine a first joint represented in the third 2D image data;
determine that the first joint is unrepresented in the second 2D image data; and
determine a loss associated with the first joint being present in the third 2D image data.

16. The system of claim 13, the non-transitory computer-readable memory storing further instructions that, when executed by the at least one processor, are further effective to:
update parameters of the 3D mesh prediction model to minimize a loss associated with joints of the human that are unrepresented in the second 2D image data representing the portion of the human being present in the 3D mesh of the portion of the human.

17. The system of claim 13, the non-transitory computer-readable memory storing further instructions that, when executed by the at least one processor, are further effective to:
- determine a first limb orientation between two joints of the joint data;
- determine a first vector representing the first limb orientation;
- determine a second limb orientation in the third 2D image data, the second limb orientation corresponding to the same limb as the first limb orientation;
- determine a second vector representing the second limb orientation; and
- determine a loss related to a difference between the first vector and the second vector.

18. The system of claim 13, the non-transitory computer-readable memory storing further instructions that, when executed by the at least one processor, are further effective to:
- determine a ground truth limb orientation for a first limb of the human using the joint data; and
- determine a predicted limb orientation of a 2D projection of the third 2D image data, wherein the predicted limb orientation is determined using a joint visible in the third 2D image data and a joint unrepresented in the third 2D image data and represented in the joint data identifying locations of joints of the human in the first 2D image data.

19. The system of claim 18, the non-transitory computer-readable memory storing further instructions that, when executed by the at least one processor, are further effective to:
- determine a loss representing a difference between the ground truth limb orientation and the predicted limb orientation; and
- update at least one parameter of the 3D mesh prediction model to minimize the loss.

20. The system of claim 13, the non-transitory computer-readable memory storing further instructions that, when executed by the at least one processor, are further effective to:
- generate the second 2D image data by determining at least one of a distance between shoulder joints of the human and a position of a center of a face of the human.

\* \* \* \* \*